(12) United States Patent
Savir et al.

(10) Patent No.: US 11,010,260 B1
(45) Date of Patent: May 18, 2021

(54) GENERATING A DATA PROTECTION RISK ASSESSMENT SCORE FOR A BACKUP AND RECOVERY STORAGE SYSTEM

(71) Applicant: EMC IP Holding Company LLC, Hopkinton, MA (US)

(72) Inventors: Amihai Savir, Sansana (IL); Shai Harmelin, Haifa (IL); Anat Parush Tzur, Kibbutz Beit Kama (IL); Idan Levy, Kadima-Zoran (IL); Roi Gamliel, Moshav Tkuma (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 730 days.

(21) Appl. No.: 15/395,697

(22) Filed: Dec. 30, 2016

(51) Int. Cl.
  *G06F 11/14* (2006.01)
  *G06N 7/00* (2006.01)
  *G06F 16/27* (2019.01)

(52) U.S. Cl.
  CPC .......... *G06F 11/1464* (2013.01); *G06F 16/27* (2019.01); *G06N 7/005* (2013.01); *G06F 2201/84* (2013.01)

(58) Field of Classification Search
  None
  See application file for complete search history.

(56) References Cited

U.S. PATENT DOCUMENTS

| | | | |
|---|---|---|---|
| 9,804,909 B1* | 10/2017 | Fang | G06F 11/0751 |
| 2014/0012901 A1* | 1/2014 | Ruhl | G06Q 10/06 709/203 |
| 2014/0310235 A1* | 10/2014 | Chan | G06F 9/4881 707/603 |
| 2015/0379357 A1* | 12/2015 | Datta | G06T 7/251 382/155 |
| 2016/0147583 A1* | 5/2016 | Ben Simhon | H04L 43/0823 714/47.3 |
| 2017/0010931 A1* | 1/2017 | Agarwal | G06F 11/079 |

* cited by examiner

*Primary Examiner* — Giuseppi Giuliani
(74) *Attorney, Agent, or Firm* — Womble Bond Dickinson (US) LLP (57) ABSTRACT

Described is a system and method that provides a data protection risk assessment for the overall functioning of a backup and recovery system. Accordingly, the system may provide a single overall risk assessment score that provide an operator with an "at-a-glance" overview of the entire system. Moreover, the system may account for changes that occur over time based on leveraging statistical methods to automatically generate assessment scores for various components (e.g. application, server, network, load, etc.). In order to determine a risk assessment score, the system may utilize a predictive model based on historical data. Accordingly, residual values for newly observed data may be determined using the predictive model and the system may identify potentially anomalous or high risk indicators.

15 Claims, 7 Drawing Sheets

GENERATING A DATA PROTECTION RISK ASSESSMENT SCORE FOR A BACKUP AND RECOVERY STORAGE SYSTEM

TECHNICAL FIELD

Embodiments of the present disclosure generally relate to data storage systems. More particularly, embodiments of the disclosure relate to a system that generates a data protection risk assessment score.

BACKGROUND

Data backup and recovery systems often implement various techniques to mitigate the potential risk for data loss. For example, these systems often employ tools that monitor various functions of components within the storage system. Accordingly, these tools may alert an operator when a protection failure is identified in a backup or recovery operation, or when a protection policy compliance gap is identified (e.g. no backup occurring within a predefined time period). When providing various configurations, providers often include monitoring components with a generic policy. These policies, and the alerts derived from such policies, often rely on relatively rudimentary analysis techniques such as rule-based policies and static manually defined thresholds. Accordingly, these policies are often hard to configure and need to be manually adjusted to account for changes to a system.

Moreover, these tools often do not provide the ability to compare the overall protection health over time to different parts of a backup and recovery system. As a result, it is often difficult to obtain an overall assessment of the functioning of the system. Accordingly, there is a need to provide an improved mechanism for monitoring a data backup and recovery system that accounts for changing dynamics over time, and yet provides the ability to provide an overall assessment of the system.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosure will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Reference in the specification to "some embodiments," "one embodiment" or "an embodiment" means that a particular feature, structure, or characteristic described in conjunction with the embodiment can be included in at least one embodiment of the disclosure. The appearances of the phrase "embodiment" in various places in the specification do not necessarily all refer to the same embodiment.

According to some embodiments, described is a system (and method) that provides a data protection risk assessment for the overall functioning of a backup and recovery system. In one embodiment, the system may provide a single overall risk assessment score that provides an operator with an "at-a-glance" overview of the entire system. Moreover, the system may account for changes that occur over time based on leveraging statistical methods to automatically generate these assessment scores for various components (e.g. application, server, network, load, etc.). Accordingly, the system described herein may provide several advantages over other monitoring tools. For example, the system may utilize a predictive model based on historical data, and accordingly, various thresholds that identify anomalous behavior may be configured automatically. This relieves an administrator from having to configure various alerts as part of a policy configuration. In addition, as described above, the system may provide a single risk assessment score that provides a simpler, yet more intelligent monitoring environment. As further described herein, this system may be provided within a configuration as shown in FIG. 1.

Figure 1:
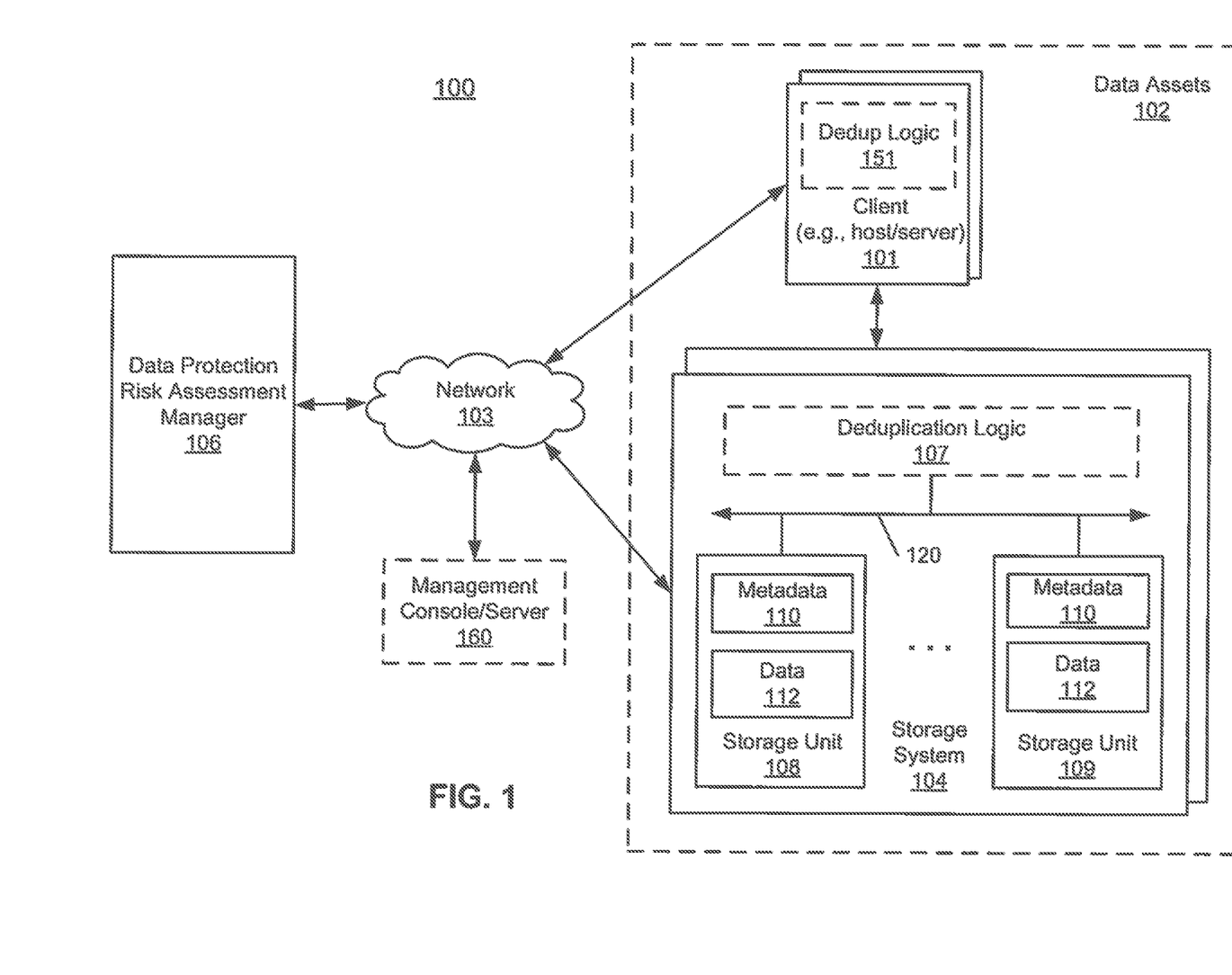
FIG. 1 is a block diagram illustrating a system configuration according to one embodiment of the disclosure.

FIG. 1 is a block diagram illustrating a system configuration according to one embodiment of the disclosure. Configuration 100 may include various data assets 102 to form a backup and recovery system. The data assets 102 may include one or more clients 101 communicatively coupled to one or more storage systems 104 over network 103 or via a direct connection.

Client (or clients) 101 may be any type of client such as a host or server, a personal computer (e.g., desktops, laptops, and tablets), a "thin" client, a personal digital assistant (PDA), a Web enabled appliance, or a mobile phone (e.g., Smartphone), etc. Alternatively, the client 101 may be a primary storage system (e.g. local data center) that provides storage to other local clients, which may periodically backup the content stored therein to a backup or replication storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Client 101 may be in physical proximity or may be physically remote from one another. Storage system 104 may be located in proximity to one, both, or neither of client 101.

Storage system 104 may include or represent any type of server or a cluster of one or more servers (e.g., cloud servers). For example, storage system 104 may be a storage server used for various different purposes, such as to provide multiple users or client systems with access to shared data, to provide backup (or restore) data (e.g., mission critical data) services, or replication services (e.g. redundant storage) for various purposes such as recovery (e.g. disaster recovery). Storage system 104 may provide storage services to clients or users via a variety of access interfaces and/or protocols such as file-based access protocols and block-based access protocols. For example, the file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

Storage system 104 may also include various storage services (or logic), optional deduplication logic 107, and one or more storage units or devices 108-109 communicatively coupled to each other. Storage services may represent any storage service related components configured or adapted to provide storage services (e.g., storage as a service) to a variety of clients 101. For example, storage services may include backup and restore services. Backup services may include services configured to receive and backup data from a client 101 and to store the backup data in any one or more of storage units 108-109. Restore services may include services configured to retrieve and restore backup data from any one or more of storage units 108-109 back to the client 101. When providing these and related services, the storage system 104 and/or client 101 may provide various performance indicators as further described herein.

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, solid state drive (SSD), a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109.

The metadata, such as metadata 110, may be stored in at least some of storage units 108-109, such that files can be accessed independent of another storage unit. Metadata of each storage unit includes enough information to provide access to the files it contains. As referred to herein, metadata 110 includes data associated with various attributes of the file, such as index information, file name/identifier, file location, file length, date stamp, permission, whether a file has been removed from the current file system, whether a file has been renamed, etc. For example, when performing a search for data as further described herein, the system may access the metadata 110 to identify and locate the requested data (e.g. requested via a query).

Metadata may also include fingerprints contained within data 112, where, for example, data 112 represents a data segment, a compression region (CR) of data segments, or a container of one or more CRs. In addition, the metadata 110 may include reconstruction information for the data 112 (or data files) that may be segmented. For example, metadata 110 for storage units (e.g. storage unit 108) may be reconstructed using metadata information stored on another storage unit (e.g. storage unit 109) or other type of storage unit (e.g. replica storage unit).

Data protection risk assessment manager (or risk assessment manager) 106 may include various services, logic, or modules related to determining a risk assessment score for the backup and recovery system. For example, the risk assessment manager 106 may include a data collection module, analysis module that includes a predictive model, a parameter weighting, module, and a risk assessment score aggregation module. These modules may perform various processes to determine various risk assessment scores as further described herein.

In one embodiment, the risk assessment manager 106 may reside on one or more separate devices or servers from the client device 101 or storage system 104 as shown. In addition, in other embodiments, the risk assessment manager 106 may be part of storage system 104, client device 101, or management console/server 160 (not shown).

Client 101 may further include optional deduplication logic (e.g., deduplication logic 151-152) having at least a portion of functionalities of deduplication logic 107. Deduplication logic 151-152 are configured to perform local deduplication operations, respectively. For example, prior to transmit data to storage system 104, each of the deduplication logic 151-152 may deduplicate the data into deduplicated segments and determine whether a particular deduplicated segment has already been stored in storage system 104. A deduplicated segment is transmitted to storage system 104 only if the deduplicated segment has not been stored in storage system 104. For example, when client 101 is about to transmit a data stream (e.g., a file or a directory of one or more files) to storage system 104, deduplication logic 151 is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may be previously received from the same client 101 or from another client such as client 102. In response to storage system 104 indicating that the segment has not been stored in storage system 104, that particular segment is then transmitted over to the storage system 104. As a result, the network traffic or bandwidth and the processing resources required can be greatly reduced.

Storage system 104 may further include a storage manager or storage controller (not shown) configured to manage storage resources of storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements.

It should be noted that some or all of the components as shown and described above (e.g. of FIG. 1) may be implemented in software, hardware, or a combination thereof. For example, such components can be implemented as software installed and stored in a persistent storage device, which can be loaded and executed in a memory by a processor (not shown) to carry out the processes or methods described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 2:
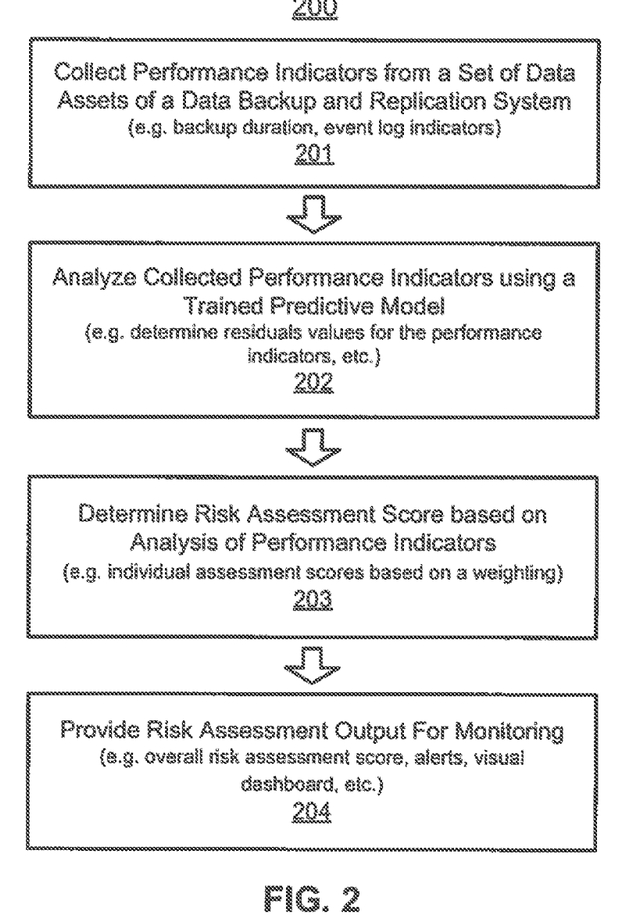
FIG. 2 is a block diagram illustrating a process flow overview for providing a data protection risk assessment score according to one embodiment of the disclosure.

FIG. 2 is a block diagram illustrating a process flow overview for providing a data protection risk assessment score according to one embodiment of the disclosure. Process 200 may be performed by a system (e.g. one or more components of system 100 such as risk assessment manger 106, storage system 104, etc.).

In 201, the system may collect various performance indicators from a set of data assets (e.g. data assets 102) that are part of, or form, a data backup and replication system. The performance indicators may include various types of information provided by the data assets for monitoring the functioning of backup and/or replication services. For example, the performance indicators may include event logs such as backup logs, replication logs, application logs, and various other types of logs. For instance, performance indicators derived from these logs may include identifying the occurrence of a particular event, a count for a particular event, or any other information associated with an event or process. As another example, the performance indicators may include various metrics related to the performance of various components of the system. For instance, these metrics may describe network traffic, storage loads or capacity, bandwidth usage, processor usage, memory usage, backup or replication size, backup or replication duration, number of backups or replications occurring within a time period, or any other type of metric that may be measured by the system. Accordingly, these performance indicators may be used as the basis for providing a risk assessment analysis. For example, as further described herein, the values may be used as input (e.g. signal input) for a time series analysis.

In 202, the system may analyze the collected performance indicators using a predictive model that provides an expected range of values for various performance indicators. The system may utilize a time series predictive model, and accordingly, the system may routinely update the model. In addition, the predictive model may also track various alerts that the system may generate.

The implementation of the model may include two phases; a training phase, and a scoring phase. In the training phase, the predictive model may be trained using previously collected performance indicators (e.g. historical data). For example, upon implementing the risk assessment manger 106, the system may train the predictive model as part of an initialization process using, for example, a set of historical data spanning days, weeks, or months. For example, a baseline analysis may be established for various performance indicators using a time series analysis. For example, the time series predictive model may identify that a particular backup service typically stores 8-10 GB of data on weekdays, while the same service allocates 40-50 GB of data on weekends. Accordingly, as further described herein, a distribution of residuals may be fitted according to the baseline. As referred to herein, a residual (or residual value) relates to the difference between a predicted performance indicator and an actual or observed performance indicator.

In addition to being the basis for the risk assessment scores, the time series analysis may also be a valuable tool for the system to identify notable patterns or trends regarding the demand for system resources. For example, using the above example, the system may identify the increased demand for storage capacity during weekends. It should be noted that the system may re-train the model at various intervals to reflect more recent patterns or trends.

The system may implement any suitable time series model. For example, the model may be implemented as a regression model, neural network, autoregressive integrated moving average (ARIMA) model, a Holt-Winters model, or any other suitable model. In one embodiment, the system may use a Holt-Winters model due to the simplicity and ease of updating the model in an online manner. In one embodiment, the predictive model may fundamentally track three components of a signal (e.g. input): Level, Bias, and Seasonality.

For example, the model may incorporate the following time-series equations:

$$\text{Level:} L_t = (Y_t - S_{t-s}) + (1-\gamma)(L_{t-1} + B_{t-1}) \quad (1)$$

$$\text{Bias:} B_t = (L_t - L_{t-1}) + (1-\beta)_{t-1} \quad (2)$$

$$\text{Seasonality:} S_t = (Y_t - L_t) + (1-\gamma)_{t-s} \quad (3)$$

$$\text{Forecast:} F_{t+k} = L_t + kB_t + S_{t+k-s} \quad (4)$$

where $Y_t$ is the actual (or observed) value of a performance indicator at time t and s is the length of the seasonal cycle. A more detailed description and analysis of the above equations may be found in "*The Analysis of Time Series: An Introduction,*" 6th Edition, by Chris Chatfield, CRC Press, 19 Nov. 2013, which is incorporated herein by reference in its entirety.

In one embodiment, the time series may be provided to a streaming mechanism, which calculates the residuals. For example the residuals may be determined using the following equation:

$$\text{Residuals:} r_{t+k} = F_{t+k} - Y_{t+k} \quad (5)$$

Figures 3A, 3B:
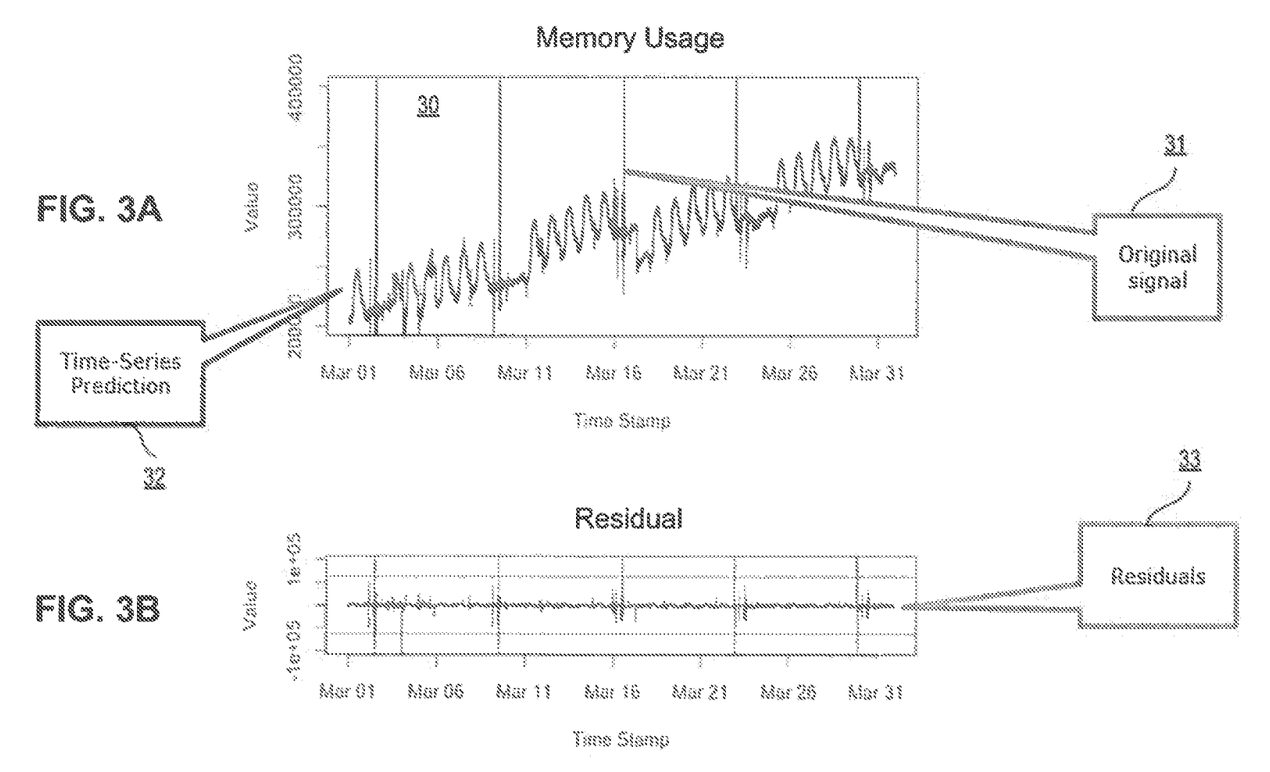
FIG. 3A is a diagram illustrating an example comparison between actual performance indicator values and values determined by a predictive model according to one embodiment of the disclosure.
FIG. 3B is a diagram illustrating residual values determined from a comparison as illustrated in FIG. 3A according to one embodiment of the disclosure.

FIG. 3A is a diagram illustrating an example comparison between actual performance indicator values and values determined by a predictive model according to one embodiment of the disclosure. As shown, chart 30 displays performance indicator values for memory usage across a period of time. As shown, the system may fit a time series prediction 32 (e.g. Holt-Winters model) over the results of the original signals 31 (e.g. actual performance indicator values). Accordingly, the system may perform a comparison between actual performance indicator values and those predicted by the model. Accordingly, residuals may be determined based on quantifying such a comparison.

FIG. 3B is a diagram illustrating residual values determined from a comparison as illustrated in FIG. 3A according to one embodiment of the disclosure. As shown, residuals 33

(or residual values) may be determined, for example, by subtracting the periodic and cyclic trends (e.g. time series prediction 32) from the original signals 31 as shown in FIG. 3A. Accordingly, in the scoring phase, the system may score new residual values based on their proximity to dense areas of the historical data obtained during the training phase.

Returning to FIG. 2, in 203, the system may determine a risk assessment score based on the analysis provided by the predictive model. In one embodiment, the system may provide a weighting for particular types of performance indicators. For example, the system may use the time series prediction (e.g. as shown in FIGS. 3A-3B) and statistical histograms to determine the volume and velocity of particular storage related events. For example, the system may presume that rare events or alerts are more significant and should have a greater impact on the risk assessment than alerts that occur more frequently. For the frequently occurring events, the system may take into account the volume of the data in each time period. When providing a weighting, in one embodiment, the system may provide a weight in the range of zero to one for each type of performance indicator.

In one embodiment, the system may incorporate the performance indicator weights as part of the risk assessment score. In one embodiment, to incorporate all of the residuals obtained from the time series analysis (e.g. residual distribution fitting), the system may use a kernel distribution function such as the Multivariate Gaussian Mixture Model (GMM). For example, if there are d performance indicators being monitored, then a multivariate GMM with p components that are fit to the residuals would take the form $$f(r) = \sum_{j=1}^{p} w_j N\left(\mu_j, \Sigma_j\right) \quad (6)$$

where each $N(\mu_j, \Sigma_j)$ is a d-dimensional multivariate normal distribution with average vector $\mu_j$ and covariance matrix $\Sigma_j$, and the $w_j$ are the model's mixture proportions. Accordingly, the set of parameters for the multivariate GMM $\Phi=(w1, \ldots wp, \mu1, \ldots, \mu p, \Sigma1, \ldots, \Sigma p)$, may be estimated using an Expectation-Maximization (EM) algorithm on the historical residual data obtained from the time series analysis, with a model selection criterion such as Akaike Information Criterion (AIC) or Bayesian Information Criterion (BIC) that may be used to determine the number of mixture components p. More information on the use of mixture models for outlier detection may be found, for example, in "Outlier Analysis," 1st Edition, Charu C. Aggarwal, Springer New York, 2013, which is incorporated herein by reference in its entirety.

In order to provide the risk assessment scoring, the system may combine the time series models and residual kernel distribution built in the training phase to create a single data protection risk assessment score for the backup and recovery system at a given time. For example, the system may assume that at time t the residuals generated by the time series models for the d performance indicators are $$rt = \left\{r\frac{1}{t}, \ldots, r\frac{d}{t}\right\}.$$

Accordingly, the system may compute the data protection risk assessment score $\lambda_t$ for the system at time t by evaluating the residual kernel distribution function at $r=r_t$:

$$\lambda_t = f(r_t | \Phi) = \sum_{j=1}^{p} w_j N\left(r_t | \mu_j, \Sigma_j\right) \quad (7)$$

Figure 4:
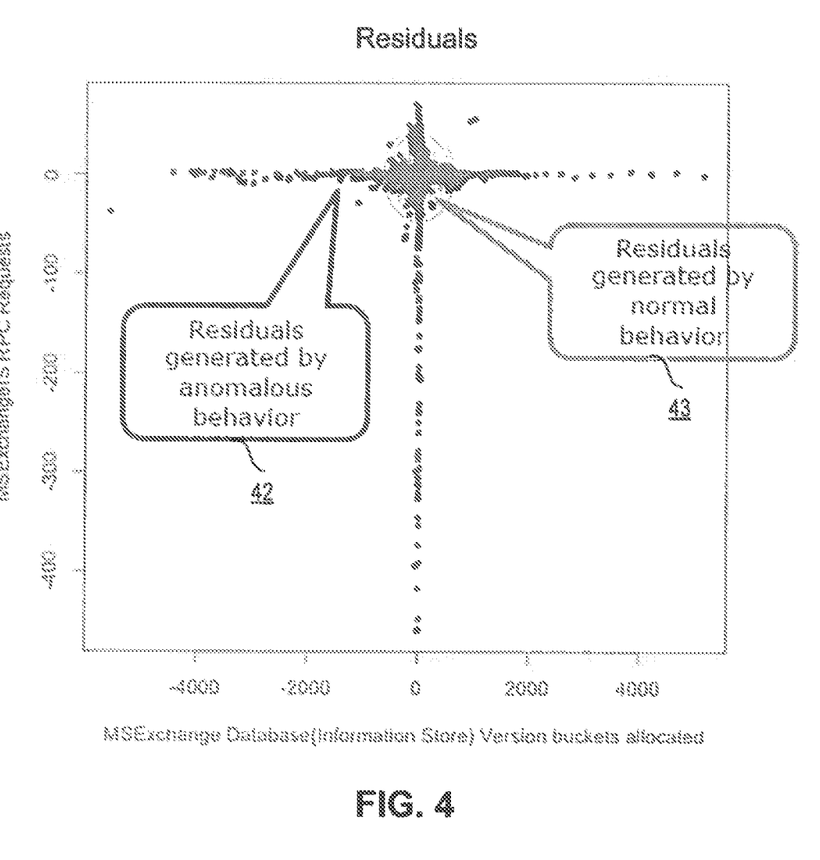
FIG. 4 is a diagram illustrating an example representation of residuals identified as anomalous according to one embodiment of the disclosure.

Accordingly, outlier values that are away from to the dense regions in the historical residual data are unusual and considered to be generated during an anomalous behavior of an asset as shown in FIG. 4.

FIG. 4 is a diagram illustrating an example representation of residuals identified as anomalous according to one embodiment of the disclosure. As shown, residuals generated by normal behavior 43 are distributed within a proximity to the center of mass. In contrast, residuals generated by anomalous behavior 42 are shown as outliers. Accordingly, these outlier residuals will have low fit values to the residual kernel distribution, or in other words, an indication of an increased risk for the data protection risk assessment score.

Accordingly, in one embodiment, the system may now set a threshold for the combined data protection risk assessment scores derived from all of the individual performance indicators. For example, whenever the data protection risk assessment score drops below the set threshold (as shown in the example of FIG. 5), an alert may be provided.

Figure 5:
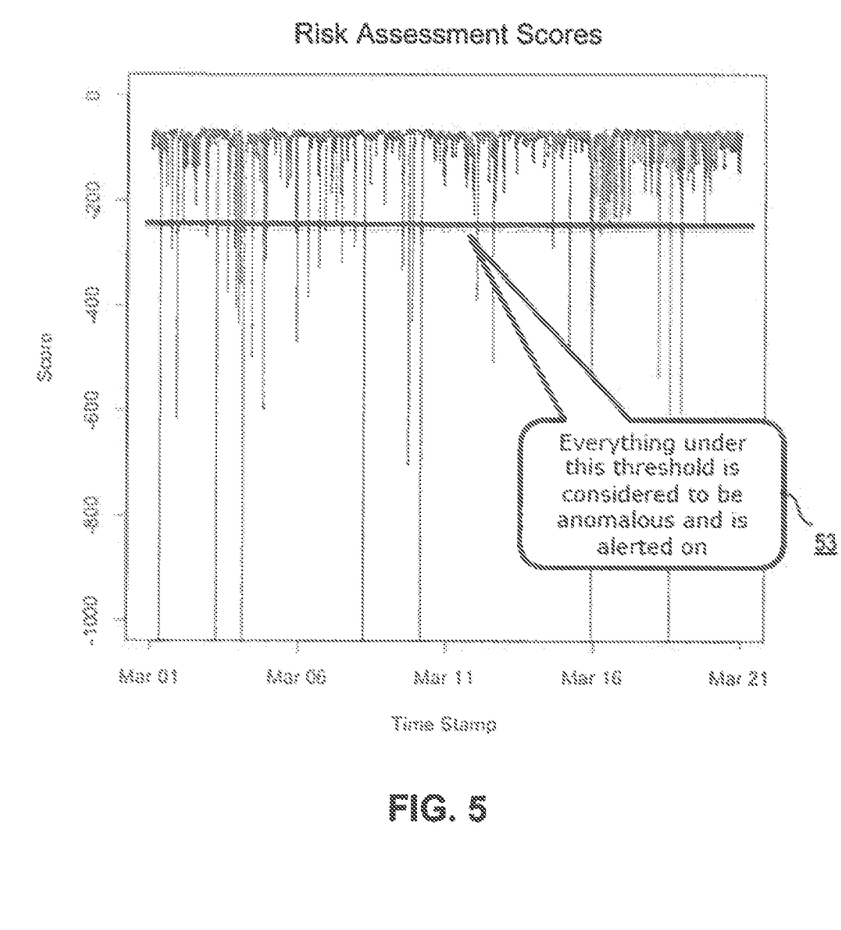
FIG. 5 is a diagram illustrating an example representation of a risk assessment score falling below a predefined threshold according to one embodiment of the disclosure.

FIG. 5 is a diagram illustrating an example representation of a risk assessment score falling below a predefined threshold according to one embodiment of the disclosure. As shown, scores that drop below the threshold are considered anomalous 53. In one embodiment, scores that are considered anomalous may initiate an alert. It should be noted that alternatively, a risk assessment score may be configured such that a score above a particular threshold may initiate an alert. By providing a risk assessment score, the severity of an event may be quantized such that an extreme score represents a large deviation from the typical behavior of a data asset. It should be noted that the model may also be capable of flagging unusual combinations of residuals for the different types of performance indicators even if the individual residuals alone are not unusual, which would not be possible by providing only an individual risk assessment score. Accordingly, in one embodiment, the system may combine alerts with their respective weights to provide a single score that describes the overall health (or potential risk) of the system. For example, the system may determine one risk assessment score for each monitored component being tracked in the system (e.g. via a corresponding type of performance indicator), and a global score may aggregate the different components such as backup, replication, application load, etc.

In addition, it should be noted that the data protection risk assessment scores shown on the vertical axis in FIG. 5 are negative numbers because the log-likelihood of (r|Φ) was computed instead of using Equation (7) directly. The numerical accuracy in the computation of data protection risk assessment score directly from Equation (7) may decrease as the number of performance indicators increases. Accordingly, taking the logarithm avoids this effect by transforming the external multiplications in additions of constants and eliminating the exponentiation from the multivariate normal probability density functions, which enables the output to be calculated as an inner product. In one embodiment, these data protection risk assessment scores may be transformed to a 0-100% scale by normalizing to the maximum possible data protection risk assessment score value (which occurs when observed residuals are at the kernel distribution's center of mass).

Returning once again to FIG. 2, in 204, the system may provide a risk assessment output for monitoring the backup and recovery system. For example, the system may provide information as part of a graphical user interface or dashboard that provides risk assessment information. For instance, the system may provide various risk assessment scores for various components as well as a single score that provides an overall risk assessment score for the backup and recovery system.

Figure 6:
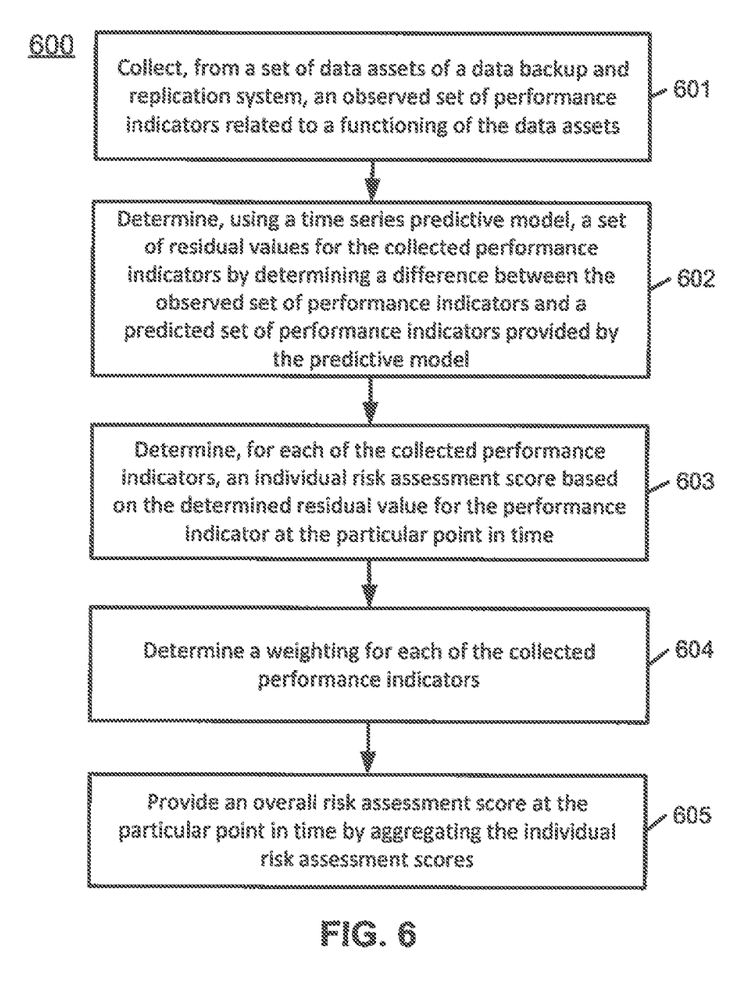
FIG. 6 is a block diagram illustrating an example method of determining an overall data protection risk assessment score according to one embodiment of the disclosure.

FIG. 6 is a block diagram illustrating an example method of determining an overall data protection risk assessment score according to one embodiment of the disclosure. Method 600 may be performed by a system (e.g. one or more components of system 100 such as risk assessment manger 106, storage system 104, etc.).

In 601, the system may collect, from a set of data assets of a data backup and replication system, an observed set of performance indicators related to a functioning of the data assets. For example, the performance indicators may include metrics for network traffic, processor usage, memory usage, backup or replication size, backup or replication duration, number of backups or replications per time period, etc. In addition, the performance indicators may include event indicators from one or more backup or replication server logs.

In 602, the system may determine, using a time series predictive model, a set of residual values for the collected performance indicators. The system may perform such a determination by determining a difference between the observed set of performance indicators and a predicted set of performance indicators provided by the predictive model, wherein the set of residual values is determined at a particular point in time of the time series. For example, the time series predictive model may be implemented as one of a regression model, neural network, autoregressive integrated moving average (ARIMA) model, etc. In one embodiment, the time series predictive model may be implemented as a Holt-Winters model that incorporates a determination of at least one of a level, bias, and seasonality as described above.

In 603, the system may determine, for each of the collected performance indicators, an individual risk assessment score based on the determined residual value for the performance indicator at the particular point in time.

In 604, the system may determine a weighting for each of the collected performance indicators. In one embodiment, the weighting for each of the collected performance indicators may be based on a frequency of occurrence of the performance indicator.

In 605, the system may provide an overall risk assessment score at the particular point in time by aggregating the individual risk assessment scores. In one embodiment, providing the overall risk assessment score may include aggregating the individual risk assessments scores based on the determined weighting for each of the collected performance indicators. In one embodiment, the overall risk assessment score may include an assessment for each of the data assets and a single global assessment score for the data backup and replication system.

In addition, the system may further provide a potential risk alert for the backup and recovery system when the overall assessment score reaches a predefined threshold or limit. For example, the system may provide a various alerts or information as part of a risk assessment dashboard graphical user interface (GUI) that an administrator or operator may monitor.

Figure 7:
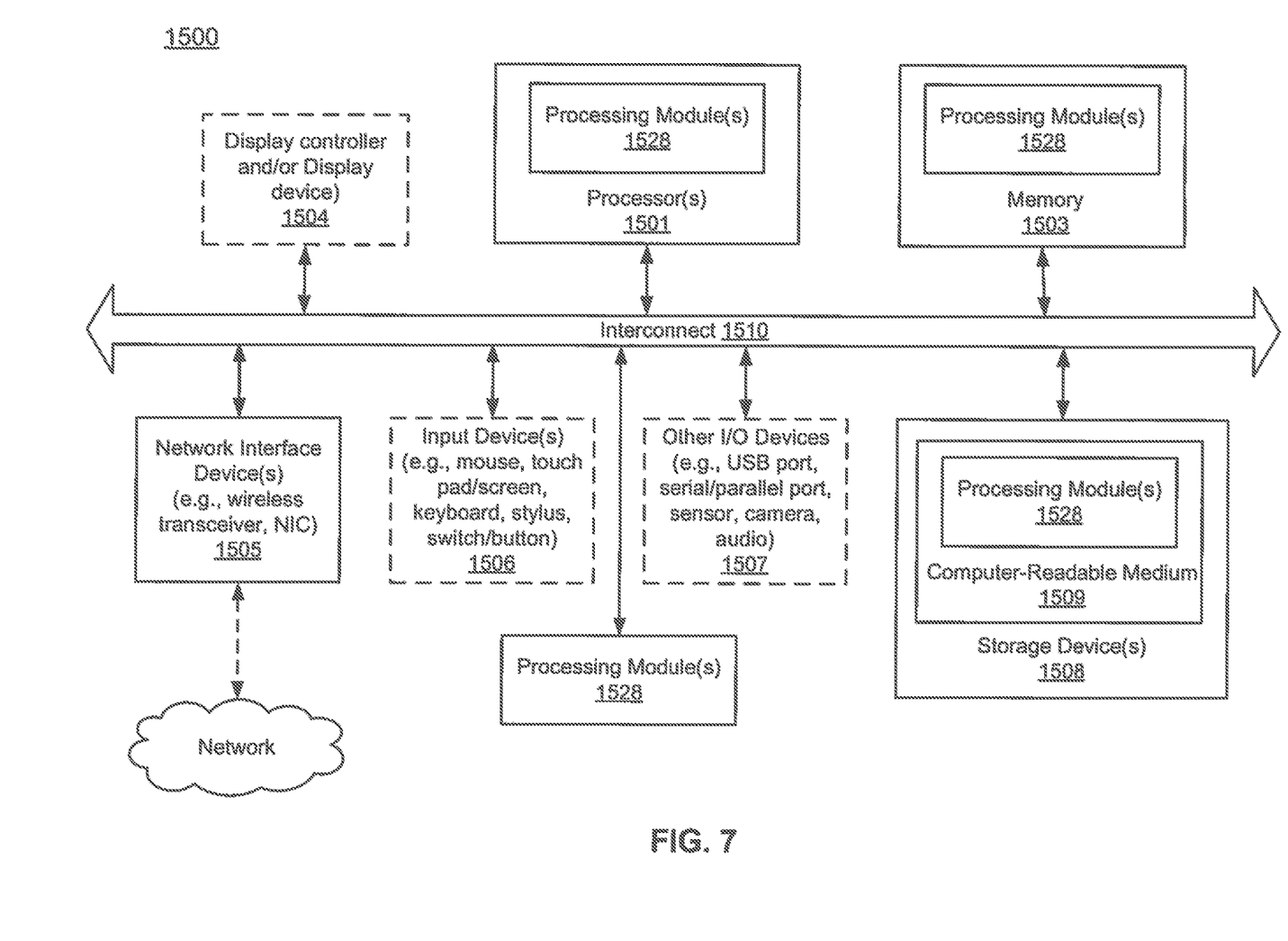
FIG. 7 is a block diagram illustrating an example computing system that may be used in conjunction with one or more embodiments of the disclosure.

FIG. 7 is a block diagram illustrating an example computing system that may be used in conjunction with one or more embodiments of the disclosure.

For example, system 1500 may represent any of data processing systems described above performing any of the processes or methods described above, such as, for example, one or more components shown in system 100 (e.g. system 100, risk assessment manager 106, storage system 104, client 101, etc.). System 1500 can include many different components. In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501 may be configured to execute instructions for performing the methods, processes, operations, functions, etc. as discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include various electronic displays (e.g., a monitor having a screen, a small LCD touch-screen or any other electrical device that is operable to display information), audio output (such as speakers). For example, vehicle 101 may include an internal electronic display. In this regard, internal electronic display may be located within a cabin of vehicle. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

Storage device 1508 may include computer-readable storage medium 1509 (or machine-readable storage medium, computer-accessible medium, etc.) on which is stored one or more sets of instructions or software (e.g. processing modules 1528) embodying any one or more of the methods, processes, operations, functions, etc. as described herein. In addition, the computer-readable storage medium 1509 may also include removable or portable media (e.g. magnetic disk storage media, optical storage media, USB media, CD-ROM, flash memory devices, etc.).

Processing modules 1528 (or component/unit/logic) may represent any of the components of configuration 100 (e.g. risk management manager 106, deduplication logic 107, etc.). Processing modules 1528 may also reside, completely or at least partially, within memory 1503 and/or within processor 1501 during execution thereof by system 1500, memory 1503, and processor 150, which may also constitute a computer-readable storage medium. In addition, processing modules 1528 can be implemented as firmware or functional circuitry within hardware devices. Further, processing modules 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

The processes or methods depicted in the preceding figures may be performed by processing logic that comprises hardware (e.g. circuitry, dedicated logic, etc.), firmware, software (e.g., embodied on a non-transitory computer-readable storage media), or a combination of both. Although the processes or methods are described above in terms of some sequential operations, it should be appreciated that some of the operations described may be performed in a different order. Moreover, some operations may be performed in parallel rather than sequentially.

The term "approximately" or "substantially" may be used herein and may be interpreted as "as nearly as practicable," "within technical limitations," and the like. In addition, the use of the term "or" indicates an inclusive "or" (e.g. "and/or") unless otherwise specified.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
   collecting, from a set of a plurality of data assets of a data backup and replication system, an observed set of performance indicators related to a functioning of each of the data assets;
   determining, using a time series predictive model, a set of residual values for the collected performance indicators by determining a difference between the observed set of performance indicators and a predicted set of performance indicators provided by the predictive model, wherein the set of residual values is determined at a particular point in time of the time series;
   determining, for each of the collected performance indicators, an individual risk assessment score based on the determined residual value for the performance indicator at the particular point in time;
   determining a weighting for each of the collected performance indicators based on a frequency of occurrence of each of the collected performance indicators, wherein the weighting increases as the frequency of occurrence decreases, such that rare occurrences are weighted higher than frequent occurrences; and
   providing an overall risk assessment score at the particular point in time by aggregating the individual risk assessment scores based on the determined weighting for each of the collected performance indicators, wherein the overall risk assessment score includes a risk assessment score for each of the data assets and a single global assessment score for the data backup and replication system.

2. The method of claim 1, wherein the performance indicators comprise network traffic, backup size, and backup duration.

3. The method of claim 1, further comprising providing a potential risk alert for the backup and recovery system when the overall assessment score reaches a predefined limit.

4. The method of claim 1, wherein the time series predictive model is implemented as one of a regression model, neural network, autoregressive integrated moving average (ARIMA) model, and a Holt-Winters model.

5. The method of claim 1, wherein the time series predictive model is implemented as a Holt-Winters model that incorporates a determination of at least one of a level, bias, and seasonality.

6. The method of claim 1, wherein the performance indicators include metrics for one or more of network traffic, processor usage, memory usage, backup or replication size, backup or replication duration, number of backups or replications per time period.

7. The method of claim 1, wherein the performance indicators include event indicators from one or more backup or replication server logs.

8. A non-transitory computer-readable medium storing instructions which, when executed by one or more processors of a computing device, cause the computing device to perform operations comprising:

collecting, from a set of a plurality of data assets of a data backup and replication system, an observed set of performance indicators related to a functioning of each of the data assets;

determining, using a time series predictive model, a set of residual values for the collected performance indicators by determining a difference between the observed set of performance indicators and a predicted set of performance indicators provided by the predictive model, wherein the set of residual values is determined at a particular point in time of the time series;

determining, for each of the collected performance indicators, an individual risk assessment score based on the determined residual value for the performance indicator at the particular point in time;

determining a weighting for each of the collected performance indicators based on a frequency of occurrence of each of the collected performance indicators, wherein the weighting increases as the frequency of occurrence decreases, such that rare occurrences are weighted higher than frequent occurrences; and providing an overall risk assessment score at the particular point in time by aggregating the individual risk assessment scores based on the determined weighting for each of the collected performance indicators, wherein the overall risk assessment score includes a risk assessment score for each of the data assets and a single global assessment score for the data backup and replication system.

9. The medium of claim 8, wherein the performance indicators comprise number of replications occurring within a time period, replication size, and replication duration.

10. The medium of claim 8, further comprising providing a potential risk alert for the backup and recovery system when the overall assessment score reaches a predefined limit.

11. The medium of claim 8, wherein the time series predictive model is implemented as one of a regression model, neural network, autoregressive integrated moving average (ARIMA) model, and a Holt-Winters model.

12. The medium of claim 8, wherein the time series predictive model is implemented as a Holt-Winters model that incorporates a determination of at least one of a level, bias, and seasonality.

13. A data processing system, comprising:
a memory storing instructions; and
a processor coupled to the engine and the memory to execute the instructions from the memory, the processor being configured to perform operations, the operations comprising:

collecting, from a set of a plurality of data assets of a data backup and replication system, an observed set of performance indicators related to a functioning of each of the data assets;

determining, using a time series predictive model, a set of residual values for the collected performance indicators by determining a difference between the observed set of performance indicators and a predicted set of performance indicators provided by the predictive model, wherein the set of residual values is determined at a particular point in time of the time series;

determining, for each of the collected performance indicators, an individual risk assessment score based on the determined residual value for the performance indicator at the particular point in time;

determining a weighting for each of the collected performance indicators based on a frequency of occurrence of each of the collected performance indicators, wherein the weighting increases as the frequency of occurrence decreases, such that rare occurrences are weighted higher than frequent occurrences; and providing an overall risk assessment score at the particular point in time by aggregating the individual risk assessment scores based on the determined weighting for each of the collected performance indicators, wherein the overall risk assessment score includes a risk assessment score for each of the data assets and a single global assessment score for the data backup and replication system.

14. The system of claim 13, wherein the time series predictive model is implemented as one of a regression model, neural network, autoregressive integrated moving average (ARIMA) model, and a Holt-Winters model.

15. The system of claim 13, wherein the time series predictive model is implemented as a Holt-Winters model that incorporates a determination of at least one of a level, bias, and seasonality.

* * * * *